United States Patent
Gardner et al.

(10) Patent No.: US 11,453,222 B2
(45) Date of Patent: Sep. 27, 2022

(54) LIQUID SENSOR PACKAGE

(71) Applicant: HEWLETT-PACKARD DEVELOPMENT COMPANY, L.P., Spring, TX (US)

(72) Inventors: James Michael Gardner, Corvallis, OR (US); Sirena Lu, Corvallis, OR (US); Frank D. Derryberry, Corvallis, OR (US); Michael W. Cumbie, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/959,375

(22) PCT Filed: Oct. 25, 2019

(86) PCT No.: PCT/US2019/058137
§ 371 (c)(1),
(2) Date: Jun. 30, 2020

(87) PCT Pub. No.: WO2021/080614
PCT Pub. Date: Apr. 29, 2021

(65) Prior Publication Data
US 2021/0402786 A1 Dec. 30, 2021

(51) Int. Cl.
*B41J 2/175* (2006.01)

(52) U.S. Cl.
CPC .................. *B41J 2/17566* (2013.01)

(58) Field of Classification Search
CPC .................................................. B41J 2/17566
See application file for complete search history.

(56) References Cited

U.S. PATENT DOCUMENTS

| | | | |
|---|---|---|---|
| 5,699,090 A * | 12/1997 | Wade | B41J 2/04513 347/19 |
| 7,224,256 B2 | 5/2007 | Parsons | |
| 8,313,183 B2 | 11/2012 | Platt et al. | |
| 9,400,204 B2 | 7/2016 | Schoenberg | |
| 9,669,622 B2 | 6/2017 | Yokoyama et al. | |
| 2008/0041152 A1 | 2/2008 | Schoenberg | |
| 2017/0234818 A1* | 8/2017 | Jesme | G01N 25/56 374/54 |

FOREIGN PATENT DOCUMENTS

WO  WO-2017189013 A1  11/2017

* cited by examiner

*Primary Examiner* — Jason S Uhlenhake
(74) *Attorney, Agent, or Firm* — Dicke Billig & Czaja PLLC (57) ABSTRACT

A liquid level sensor package for a replaceable print liquid reservoir, the package including a number of heater circuits, each heater circuit including a heater element to dissipate heat and a number of control devices, each control device individually controllable to be electrically connected to the heater element, the heater element to dissipate a different amount of heat when electrically connected to different ones of the control devices.

23 Claims, 1 Drawing Sheet

LIQUID SENSOR PACKAGE

CROSS-REFERENCE TO RELATED APPLICATIONS

This application is a U.S. National Stage Application of PCT Application No. PCT/US2019/058137, filed Oct. 25, 2019, entitled "LIQUID LEVEL SENSOR PACKAGE FOR REPLACEABLE LIQUID RESERVOIR".

BACKGROUND

Print apparatus may employ replaceable print apparatus components for apparatus components expected to have operating lifespans less than that of the print apparatus. For example, some printing systems employ replaceable print cartridges that hold stores of printing liquid (e.g., ink) or other print material.

BRIEF DESCRIPTION OF THE DRAWINGS

FIG. 2 is a block and schematic diagram generally illustrating a sensor circuitry package, according to one example.

FIG. 3 is a block and schematic diagram generally illustrating a replaceable print apparatus component including a sensor circuitry package, according to one example.

FIG. 4 is a block and schematic diagram generally illustrating a sensor circuitry package, according to one example.

FIG. 5 is a cross-sectional view of a sensor die of a sensor circuitry package, according to one example.

FIG. 6 are graphs illustrating a temperature response of a thermal ink level sensor of a sensor circuitry package to a heating pulse, according to one example.

FIG. 7 is a block and schematic diagram generally illustrating a sensor circuitry package, according to one example.

FIG. 8 is a block and schematic diagram generally illustrating a sensor circuitry package, according to one example.

FIG. 9A is a block and schematic diagram generally illustrating a heater circuit of a sensor circuitry package, according to one example.

FIG. 9B is a block and schematic diagram generally illustrating a heater circuit of a sensor circuitry package, according to one example.

FIG. 10A is a block and schematic diagram generally illustrating heater actuation logic of a sensor circuitry package, according to one example.

FIG. 10B is a block and schematic diagram generally illustrating sensor actuation logic of a sensor circuitry package, according to one example.

FIG. 11 is a flow diagram generally illustrating a method of operating a sensor circuitry package, according to one example.

FIG. 12 is a flow diagram generally illustrating a method of operating a liquid level sensor package, according to one example

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Print apparatus may employ replaceable print apparatus components for components that have operating lifespans which are expected to be less than that of the print apparatus. For example, some printing systems employ replaceable print cartridges that hold a volume (or volumes) of print liquid (e.g., ink) or other print material.

During printing operations, the print liquid may be supplied (e.g., under pressure) to a print head for deposition, such as onto a medium to form text or images, for example. Over time, the volume of print liquid held by a container or reservoir within the print cartridge becomes depleted. Performing a print operation when the reservoir is empty or is not properly pressurized may cause damage to print components, such as to the print head and to the print cartridge itself. Additionally, print quality can suffer if a print operation is performed with an insufficient amount of print liquid in the reservoir, and user dissatisfaction may result if a cartridge runs out of print liquid without the user being able to adequately prepare for such occurrence, such as by having additional print cartridges available.

Figure 1A:
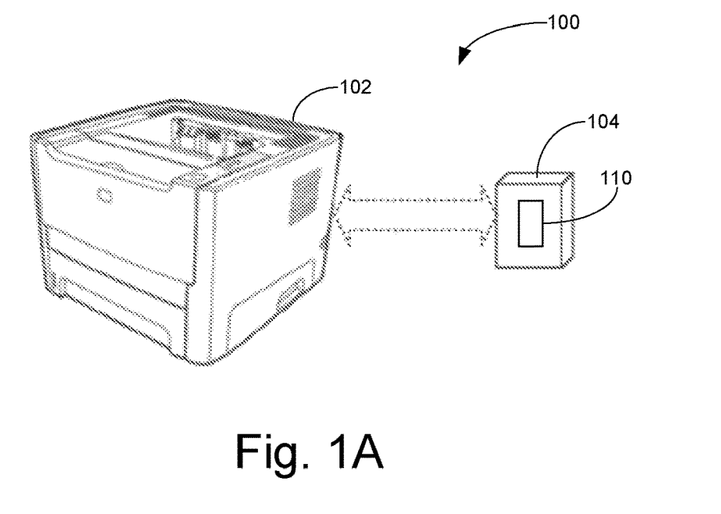
FIG. 1A is a block and schematic diagram generally illustrating a print apparatus employing a replaceable print apparatus component including a sensor circuitry package, according to one example.

FIG. 1A generally illustrates an example of a printing system 100 including a print apparatus 102 employing a replaceable print apparatus component 104 including a sensor circuitry package 110 having a number of sensing devices to sense one more operating conditions of the replaceable print apparatus component 104, in accordance with the present disclosure. Although illustrated external to print apparatus for clarity, in some examples, the replaceable print apparatus component 104 may be housed within print apparatus 102.

Examples of replaceable print apparatus component 104 include a print material container or cartridge storing a volume of print material (e.g., a build material for 3D printing, a liquid or dry toner container for 2D printing, or an ink or liquid print agent container for 2D or 3D printing) which, in some examples, may include a print head or other dispensing or transfer component. As will be described in greater detail herein, sensor circuit package 110 may include a number of sensing devices to sense a number of operating conditions of replaceable print apparatus component 104, such as a level of a print material (e.g., a fluidic print agent) within a container or reservoir, and a pressurization level within replaceable print apparatus component 104, for example.

Figure 1B:
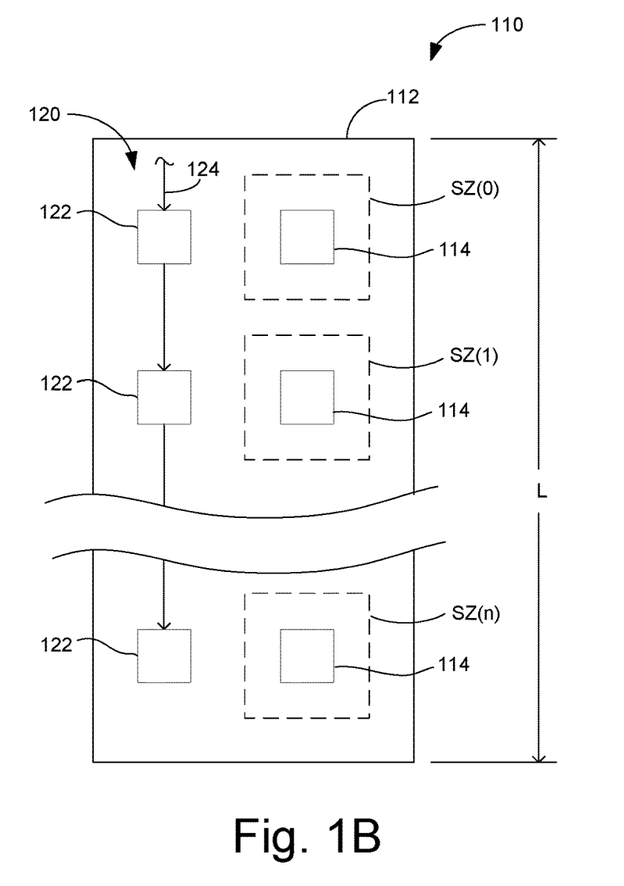
FIG. 1B is a block and schematic diagram generally illustrating a sensor circuitry package, according to one example.

FIG. 1B is a block and schematic diagram generally illustrating sensor circuit package 110, according to one example. Sensor circuitry package 110 includes a sensing die 112 having a number of sensing zones, illustrated as sensing zones SZ(0) to SZ(n). In one example, each sensing zone, SZ(0) to SZ(n), includes a number of sensing devices 114, with each sensing device 114 having a respective sensing function. In one example, as illustrated, each sensing zone, SZ(0) to SZ(n), may include one sensing device 114. In other examples, as will be described in greater detail below, each sensing zone, SZ(0) to SZ(n), may include multiple sensing devices 114.

Sensing devices 114 may include any number of different types of sensors, where each type of sensor is employed to measure a different property of sensor circuitry package 110, where such property is indicative of an operating condition of replaceable print apparatus component 104. For example, sensing device 114 may be a thermal sensor to sense a temperature of sensing die 112, where such temperature is indicative of an amount of print material (e.g., ink) within a reservoir within replaceable print apparatus component 104. In another case, each sensing device 114 may be a strain-gauge sensor to measure a strain within a substrate of sensing die 112, where such strain may be indicative of a pressure within the print material reservoir of replaceable print apparatus component 104. Any number of other sensor types to sense various other properties of sensor circuitry package 110 indicative of various other operating conditions of replace print apparatus component 104 may be employed.

Sensing devices 114 may also include any number of stimulating devices which may be employed to stimulate or generate a property within sensing die 112 to be sensed by a sensor, where such property is indicative of a condition of replaceable print apparatus component 104. For example, in one case, as will be described in greater detail herein, sensing device 114 may be a heater circuit to generate heat, where a resulting temperature measured by a thermal sensor is indicative of a print liquid level within a reservoir of replaceable print apparatus component 104. In other cases, a stimulating device may provide an electrical stimulation, such as a current or voltage, where a sensed value of such electrical stimulation is indicative of an operating condition of replaceable print apparatus component 104. Sensing device 114 may include any number of other stimulating devices to provide various stimuli may be employed by sensor circuitry package 110.

In one example, sensing zones SZ(0) to SZ(n) are arranged in a linear fashion along a length, L, of sensing die 112. In one example, sensing zones SZ(0) to SZ(n) may be evenly spaced along length, L, of sensor die 112. In other examples, spacing may vary between sensing zones along length, L, of sensing die 112. For example, sensing zones may be arranged so as to be closer together at one end of sensing die 112 than at an opposing end of sensing die 112. While any suitable number of sensor zones may be employed, in one example, sensing die 112 includes 126 sensing zones (i.e., SZ(0) to SZ(125)).

According to examples, sensing die 112 further includes an array 120 of memory elements 122, with each memory element 122 corresponding to a respective one of the sensing zones SZ(0) to SZ(n). In one example, as illustrated, the array 120 comprises a series or chain of memory elements 122, such that array 120 may sometimes be referred to as scan chain. In one example, array 120 is implemented to function as a serial-to-parallel data converter. In one example, array 120 of memory elements 122 comprises a sequential logic circuit (e.g., flip-flop arrays, latch arrays, etc.). In one example, the sequential logic circuit is adapted to function as a serial-in, parallel out shift register. While array 120 is illustrated by FIG. 1B as having one memory element 122 corresponding to each sensing zone SZ(0) to SZ(n), in other examples, array 120 may include more than one memory element 122 corresponding to each sensing zone SZ(0) to SZ(n), such as illustrated by FIG. 8 below.

During a sensing operation, array 120, via a communication path 124, is to serially load a segment of select bits into memory elements 122, each select bit having one a select value (e.g., a logic value of "1") and a non-select value (e.g., a logic value of "0"). After the segment of select bits has been loaded, a memory element 122 storing a select bit having a select value is to select at least one sensing device 114 of the respective sensing zone, SZ, to be enabled to perform its respective sensing function. For example, when memory element 122 corresponding to sensing zone SZ(n) has a select bit having a select value (e.g., a logic value of "1") sensing device 114 of sensing zone SZ(n) is selected to perform its respective sensing function (e.g., a thermal measurement to determine a fluid level).

Array 120 of memory elements 122 provides an efficient technique to select sensing devices 114 of sensing die 112 to be enabled for operation, such as compared to I2C transactions (Inter-Integrated Circuit), for example, which may be time consuming. Additionally, in some cases, as described in greater detail herein, array 120 of memory elements 122 may comprise a chain of flip-flops which is not initialized to a fixed state before receiving a segment of select data bits, thereby eliminating a need for a reset signal and reducing space requirements for array 120.

FIG. 2 is a block and schematic diagram generally illustrating sensor circuitry package 110, according to one example. In one case, sensing circuitry package 104 includes a carrier 126 to which sensing die 112 is mounted. In examples, sensing die 112 is glued, bonded, or otherwise affixed to carrier 126. Carrier 126 may be formed from a polymer, glass, or other suitable material. For example, carrier 126 may include a composite material having woven fiberglass cloth with an epoxy resin binder. In other examples, carrier 126 may be a glass-reinforced epoxy laminate sheet, tube, or rod or printed circuit board. In some cases, carrier 126 may include embedded electrical traces or conductors.

According to examples, in addition to the plurality of sensor zones, SZ(0) to SZ(n), and array 120, sensing die 112 includes control circuitry 130 and an electrical interface 132 having a plurality of electrical contacts 134 via which electrical signals may be communicated with external devices, such as print apparatus 102, or other devices within replaceable print apparatus component 104 (e.g., control circuitry), for example. In some cases, sensing die 112 may include sensing devices other than sensing devices 114 of sensing zones, SZ(0) to SZ(n), such as a global temperature sensor 136 (e.g., a thermistor) which may be disposed about sensing zones, SZ(0) to SZ(n) and be controlled separately from sensing devices 114. According to examples, control circuitry 130 includes analog and digital circuitry to perform sensing operations of sensor circuitry package 110, such as based on signals received via electrical interface 132 (e.g., from print apparatus 102).

FIG. 3 is a block and schematic diagram generally illustrating sensing circuitry package 110 arranged within a replaceable print apparatus component 104, where replaceable print apparatus component 104 is a replaceable print cartridge storing a volume of print liquid 140 (e.g., ink) within a reservoir 142. According to one example, sensing circuitry package 110 is implemented to sense a level of print liquid 140 within reservoir 142. In one example, sensing circuitry package 104 is disposed within print cartridge 104 so that a portion of sensing circuit package 104 is disposed within reservoir 140 so as to be in contact with print liquid 140. In one case, sensing circuitry package 104 is disposed so that sensing die 112 is disposed within reservoir 140 and positioned to be in contact with print fluid 142. In other examples, sensing circuitry package 104 may be disposed entirely within reservoir 140.

As will be described in greater detail below, in some examples, sensing circuitry package 104 includes sensors for determining fluid levels (e.g., thermal sensors) that, when actuated, are to output electrical signals indicative of a level of print liquid 140 within reservoir 142. In other cases, sensing circuitry package 104 may include additional sensing devices, such as strain gauge sensors, for example, which are to output electrical signals indicative of a pressure within reservoir 140 (where reservoir 140 may be pressurized to supply print fluid 142 to print apparatus 102 during print operations). In one example, electrical signals are to be transmitted between electrical interface 132 on sensing die 112 and an electrical interface 144 of replaceable print cartridge 104 via communication paths 146, with electrical interface 144 further being in communication with external devices, such as print apparatus 102.

FIG. 4 is a block and schematic diagram generally illustrating sensing circuitry package 104, according to one example, where sensing circuitry package 104 is implemented to sense a level of print liquid 140 within reservoir 142 of replaceable print cartridge 104, such as generally illustrated by FIG. 3. According to one example, memory elements 122 of array 120 are implemented as a chain of series-connected flip-flops 122, with the output (Q) of each flip-flop 122 connected to the input (D) of the next flip-flop 122 of the chain, such that array 120 functions as a serial-in, parallel out shift register.

In one example, each sensing zone, SZ(0) to SZ(n), includes a number of sensing devices 114. In one example, each sensing zone, SZ(0) to SZ(n), includes a sensor 114-1 and a respective stimulator device 114-2. In one example, as illustrated, sensor 114-1 is a thermal ink level sensor (ILS) and stimulator device 114-2 is a heater circuit, where a temperature sensed by ILS 114-1 resulting from heat generated by heater circuit 114-2 is indicative of a level of print liquid 140 within reservoir 142. In one example, sensor circuitry package 110 is disposed within reservoir 142 such that each sensing zone, SZ(0) to SZ(n), corresponds to a different level of print liquid 140 in reservoir 142.

Additionally, each sensing zone, SZ(0) to SZ(n), includes actuation logic 150. In one example, as will be described in great detail below, control circuitry 130, via communication paths 152 and 154, is to respectively provide sensor and heater enable signals to actuation logic 150 of each sensing zone, SZ(0) to SZ(n). In examples, in response to being actuated by such sensor signals, ILS 114-1 of each sensing zone, SZ(0) and SZ(n), is to provide an output sense signal (e.g., a sense voltage) in response to an input bias signal (e.g., a bias current), where such input bias signal and output sense signal are to be communicated between each sensing zone, SZ(0) and SZ(n) and controller 130 via a shared sense bus 156. In one example, as will be described in greater detail below, control circuitry 130 includes a select data generator 160 and a select data register 162 to generate segments of select bit segments for array 120.

According to one example, during a liquid level sense operation, control circuitry 130 is to provide segments of select bits to array 120 via communication path 124. In one example, after a segment of select bits has been serially loaded into array 120, for each sense zone, SZ(0) to SZ(n), the respective flip-flop 122 is to transmit the select bit to its respective actuation logic 150 via a communication path 128. In one example, upon receipt of a select bit from its respective memory element 122 having a select value (e.g., logic value of "1"), actuation logic 150 is to respectively provide sensor and heater actuation signals via paths 166 and 168 to actuate ILS 114-1 and heater circuit 114-2 to perform their respective sensing function based on the states of sensor and heater enable signals 152 and 154.

For example, when the corresponding select bit has a select value (e.g., "1") and the heater enable signal 154 is high (e.g., logic "1"), control logic 150 is to actuate corresponding heater circuit 114-2 to generate heat via heater actuation signal 168. Similarly, when the select bit has a select value (e.g., "1") and sensor enable signal 152 is high (e.g., logic "1"), control logic 150 is to actuate corresponding ILS 114-2 via sensor actuation signal 166 to perform a sensing operation and to output a sense signal (e.g., a sense voltage) indicative of a measured temperature on sense bus 156. In one example, since ILS 114-1 of each sensing zone, SZ(0) to SZ(n) is connected to the same sense bus 156, only one memory cell 122 of array 120 is to have a select bit having a select value (logic "1") at a given time.

In one example, when actuated by respective actuation signals 168 and 166, heater circuit 114-2 is to be connected via power line 158 to voltage source Vcc to generate heat, and ILS sensor 114-1 is to receive an input bias signal (e.g., a bias current, (bias) from control circuitry 130 via sense bus 156, and to provide an output sense signal representative of sensed temperature resulting from the generated heat (e.g., a sense voltage, Vsense, comprising a differential voltage measured across ILS 114-1) to control circuitry 130 via sense bus 156. In one example, a timing and a duration of the respective connections of heater circuit 114-2 and ILS 114-1 to power line 158 and sense bus 156 are respectively controlled by control circuitry 130 via sensor and heater enable signals 152 and 154.

In one example, ILS 114-1 of each sensing zone, SZ(0) to SZ(n), is a thermal sensor having an electrical characteristic that varies based on temperature. In one example, ILS 114-1 may be a thermal-diode having a forward-voltage across the diode junction which varies based on temperature. In other examples, as will be described in greater detail below, ILS 114-1 may be a thermistor having a resistance which varies based on temperature.

In examples, each heater circuit 114-2 is to generate heat when actuated. In one example, each heater circuit 114-2 includes a heating element, such as a thin-film resistor, to dissipate heat when heater circuit 114-2 actuated. In some examples, the thin-film resistor may be a doped silicon or polysilicon. In other examples, the thin-film resistor may be a metal, including refractory metals and their alloys, such as tantalum and aluminum, for example. In examples, as will be described in greater detail below, each heater circuit 114-2 may include a number of control devices (e.g., semiconductor switches) to actuate the heater element, where such control devices also dissipate heat and contribute to a total amount of heat generated by heater circuit 114-2. In examples, as described below, such control devices may be arranged that heat contributions from the control devices is minimized in some cases so that a majority of heat generated by heater circuit 114-2 is generated by the heating element (e.g., the thin-film resistor).

In one example, in each sensing zone, SZ(0) to SZ(n), each ILS 114-1 is positioned proximate to its corresponding heater circuit 114-2 so as to be influenced by a transfer of heat therefrom when the respective heater circuit 114-2 is actuated (e.g., pulsed), with an output signal from ILS 114-1 (e.g., a voltage level in response to a fixed current level) being indicative of an amount of heat transmitted to sensor 114-1. In one example, as described above, sensing circuitry package 110 is disposed within fluid reservoir 142 such that sensing die 112 is submerged within print fluid 140. In one example, as will be described in greater detail below, ILS 114-1 of each sensing zone, SZ(0) to SZ(n), is disposed proximate to a surface of sensing die 112 which is in contact with fluid 140 within reservoir 142, where each sensing zone, SZ(0) to SZ(n), corresponds to a different level of print fluid 140 within reservoir 142.

When a heater circuit 114-2 is actuated, an amount of heat transferred to its respective ILS 114-1 varies and, thus, a temperature of ILS 114-1 varies, depending upon whether the ILS 114-1 is submerged within liquid or is exposed to air (or other gas) within reservoir 142. Because a liquid has a higher heat capacity and absorbs more thermal energy than air, an amount of heat transferred from a heater circuit 114-2 to its respective ILS 114-1 will be less when the ILS 114-1 is submerged within a liquid than when exposed to air. As a result, a difference in output signals (which are representative of sensed temperatures) between ILS sensors 114-1 of zones SZ(0) to SZ(n), is indicative of a level of print liquid 140 within reservoir 142.

FIG. 5 is cross-sectional view illustrating portions of sensing die 112, according to one example, when disposed within a fluid, such as within fluid 140 of reservoir 142. In one example, sensing die 112 includes a semiconductor substrate 170 and a surface passivation layer 172, with a layer stack 174 of alternating metal and insulating layers 176 disposed there between. In one example, layer stack 174 includes four metal layers, indicated as layers Metal-1, Metal-2, Metal-3, and Metal-4, separated from one another by insulation layers 176. In one example, sensing die 112 includes a polysilicon layer 178 and an oxide layer 179 disposed between Metal-1 and substrate 170.

In one example, ILS114-1 of each sensor zone, with sensing zones SZ(x) and SZ(x-1) being illustrated in FIG. 5, are disposed in Metal-4, with respective heaters 114-2 disposed in Metal-3, such that ILS sensors 114-1 are disposed directly adjacent to reservoir 142 (e.g., separated therefrom only by surface passivation layer 172). In one example, corresponding heater elements 114-2 are disposed in Metal-3 so as to be in the metal layer directly adjacent to the metal layer in which the respective ILS 114-1 is disposed in order to better transfer heat to corresponding ILS 114-1. In other examples, heater elements 114-2 may be disposed in Metal-4, while respective ILS sensors 114-1 are disposed in Metal-3. In other examples, ILS sensors 114-1 and heater elements 114-2 may be disposed in metal layers other than Metal-4 and Metal-3.

FIG. 6 is a graph illustrating an example of a thermal response over time of ILS sensors 114-1 of sensor zones SZ(x) and SZ(x-1) of FIG. 5 in response to a heat pulse 188 provided by heater 114-2 of sensor zone SZ(x-1). Curves 180 and 182 respectively illustrate the thermal response of sensor 114-1 of SZ(x-1) when exposed to air and when submerged in fluid, while curves 184 and 186 respectively illustrate the response of ILS 114-1 of adjacent sensing zone SZ(x) in response to the same thermal pulse when exposed to air and when submerged in fluid.

In the illustrated example, a maximum temperature difference, ΔT, between temperatures sensed by thermal ILS 114-1 when exposed to air and when submerged in a fluid occurs with a heat pulse 188 having an optimal duration, Δtopt. A heat pulse having a duration less than Δtopt may not sufficiently heat the respective ILS 114-1 to achieve the maximum ΔT, while a heat pulse having a duration greater than Δtopt may result in the heating of surrounding elements of sensing die 112 (e.g., metal and insulating materials), which may reduce the maximum ΔT which may adversely impact the sensed temperatures and cause inaccuracies in a sensed fluid level. It is noted that, in addition to a liquid level, sensed temperatures by ILS 114-1 may also be indicative of other characteristics of print fluid 140.

According to one example, for a given sense zone, SZ, a temperature of ILS 114-1 is measured at optimal time, Δtopt, after application of heat pulse 188 to determine whether ILS 144-1 is exposed to air or submerged within a liquid. In one example, as described in greater detail below, a heat pulse is successively applied to each sensing zone, SZ(0) through SZ(n), via the respective heater circuit 114-2, with the thermal response of the respective ILS 114-1 being successively measured, where a change in a measured temperature from one sense zone to the next is indicative of a fluid-air boundary and thus, a level of print liquid 140 within reservoir 142.

Returning to FIG. 4, according to one example, to select an ILS 114-1 of a given sensing zone, SZ, of the number of sensing zones, SZ(0) to SZ(n), so as to be enabled to perform a sensing operation, select data generator 160 of controller 130 is to serially shift a segment of select bits into array 120. The segment has a number of bits equal to the number of sensing zones, SZ, with each select bit of the segment having a non-select value (e.g., a logic "0"), except for the select bit stored by the respective memory element 122 of the given sensing zone, SZ, which has a select value (e.g., a logic "1"). In one example, ILS sensor 114-1 of each sensing zone, SZ(0) to SZ(n), share a same sense bus 156, such that only one select bit of the segment of select bits has a select value (e.g., logic value "1") so that only one ILS 114-1 is connected to sense bus 156 at a time.

In one example, sense zones SZ(0) to SZ(n) are consecutively numbered with a zone number from 0 to n (e.g., from 0 to 125 in case where there are 126 sense zones). In one example, to select an ILS 114-1 of a given sensing zone SZ(0) to SZ(n), the zone number of the given sense zone is stored in select data register 162. In one example, select data generator 160 includes a counter, where the counter is to form the segment of select bits by shifting 0's into array 120 until the counter matches the zone number stored in select data register 162, at which point the counter inserts a "1" into the array, and thereafter returns to shifting 0's into array 120 until the complete segment of select bits has been serially shifted into array 120.

For example, in a case where sensing die 112 includes 126 sensing zones, SZ(0) to SZ(125), to select sensing zone SZ(100), the value "25" is stored in select data register 162. Select data generator 160 then serially shifts 25 select bits each having a value of "0" into array 120 until the counter matches the value of "25" stored in select data register 162, at which point select generator 160 serially shifts a select bit having a value of "1" into array 120. Select generator 160 then serially shifts 100 more select bits having a value of "0" into array 120 to complete the segment of select bits. In one example, the zone value to be stored in select data register 162 is received by control circuitry 130 via data path 146, such as from print apparatus 102, for example.

In one example, during a sensing operation, after the segment of select bits has been serially-shifted into array 120, control circuitry 130 sets the heater enable signal 154 (e.g., to a logic value "1"), such that actuation logic 150 of the selected sensing zone provides heater actuation signal 168 to connect respective heater circuit 114-2 to power line 158 to generate heat. In one example, control circuitry 130, via heater enable signal 154, actuates the heater circuit 114-2 to generate heat for the optimal time duration, Δtopt, for the particular implementation of sensing die 112.

Additionally, control circuitry 130 controls the state of sensor enable signal 152 (e.g., to a logic value "1"), such that actuation logic 150 of a selected sensing zone, SZ, provides sensor actuation signal 166 to connect respective ILS 114-1 to sense bus 156 to provide a sense signal on sense bus 156 which is indicative of a sensed temperature. In one example, as illustrated, when connected to sense bus 156, ILS 114-1 is to receive a fixed input bias current (Ibias) via sense bus 156, and to provide in response thereto a sense voltage (Vsense) having a voltage level indicative of the sensed temperature which, in-turn, is indicative of whether ILS 114-1 is disposed proximate to liquid or to air. In one example, control circuitry 130 actuates ILS 114-1 to provide Vsense on sense bus 156 when corresponding heater circuit 114-2 has been generating heat for the optimal time duration, $\Delta$topt, to thereby provide Vsense at the time of greatest sensed temperature difference, $\Delta$T, between ILS 114-1 being exposed to air versus being exposed to liquid. In one example, control circuit 130 is configured to actuate a heater circuit 114-2 and its respective ILS 114-1 at the same time, and to maintain actuation of ILS 114-1 throughout heating by ILS 114-2, and to sample the sense signal, Vsense, on sense bus 156 at an optimal time (e.g., $\Delta$topt).

In one example, the timing and duration of sensor and heater enable signals 152 and 154 is controlled via instructions received by control circuitry 130 via communication path 146, such as from print apparatus 102, for example. In one example, control circuitry 130 converts the sense voltage, Vsense, received via sense bus 156, to a digital value and transmits the digital value via communication path 146 to an external device for interpretation (e.g., whether or not ILS 114-1 is submerged in liquid), such as to a controller of print apparatus 102. In other examples, control circuitry 130 may transmit an analog value (e.g., an analog voltage or current value) representative of sense voltage, Vsense, to an external device for interpretation.

In examples, control circuitry 130 receives instructions and data via communications path 146, such as from print apparatus 102, to configure and initiate sensing operations of sensing die 112. In one example, to determine a current level of fluid 140 within reservoir 142, control circuitry 130 is configured to successively select each sensing zone, SZ(0) to SZ(n), and to actuate the respective heater circuit 114-2 and ILS 114-1, as described above, by successively serially-shifting a series of segments of select bits into array 120 where the value in the select data register 162 is incremented (or decremented) by one for each segment of select data so as to successively select the scanning zones in order from SZ(n) to SZ(0). In one example, each time a level of print liquid 140 is determined, each sensing zone is measured in order from SZ(n) to SZ(0).

In other examples, the sensed value of the ILS 114-1 of each successive sensing zone, SZ, is evaluated, such as by print apparatus 102, to determine whether the ILS 114-1 is submerged within print liquid 140 or exposed to air, wherein a change in sensed values from one sense zone to the next is indicative of a fluid-air boundary and, thus, indicative of a level of print liquid 140 within reservoir 142. In one example, upon determining a liquid-air boundary, the sensing operation is ceased so that not all sensing zones, SZ, are selected. In one example, a subset of sensing zones, SZ(0) to SZ(n) may be selected during a liquid level sensing operation based upon a level of print liquid 140 determined by a previous liquid level sensing operation. In other examples, a set of sensing zones may be measured multiple times in a row based on a known, previously sensed level. In other examples, some sensing zones may be skipped (e.g., every other zone), or zones may be randomly sensed, but sensed multiple times. Any number of sensing schemes may be implemented using ILS sensors 114-1 of sensing zones SZ(0) to SZ(n).

FIG. 7 is a block and schematic diagram generally illustrating sensing circuitry package 110, according to one example. The example implementation of FIG. 7 is similar to that of FIG. 4, except that each sensing zone, SZ(0) to SZ(n) includes a third sensing device 114-3. In one example, as illustrated by FIG. 7, third sensing device 114-3 is a strain-gauge sensor (SGS) 114-3 to sense a strain of semiconductor die 112. In one example, reservoir 142 of replaceable print apparatus component 104 may be pressurized during a print operation to transmit fluid from reservoir 142 to another location (e.g., a print head), where a strain sensed by SGS 114-3 is indicative of a pressure within reservoir 142 (e.g., where a pressure outside of an operating pressure range may be indicative of improper operation).

In one example, similar to that described above with respect to ILS 114-1 and heater circuit 114-2, SGS 114-3 of each sensing zone, SZ(0) to SZ(n), is selected for operation when, after a segment of select bits has been serially loaded into memory array 120, the corresponding memory element 122 stores a select bit having a select value (e.g., logic "1"). When the select bit has a select value, actuation logic 150 provides a strain gauge actuation signal via path 166-2 to activate SGS 114-2 to sense a strain of semiconductor die 112 based on a state of sensor enable signal 152 (e.g., when the state of sensor enable signal 152 indicates a strain sense operation). In one example, SGS 114-3 is activated by connecting SGS 114-3 to Vcc via power line 158, where biasing SGS 114-3 via voltage source Vcc results in a current that produces a voltage on an internal node which represents a sense voltage, Vsense, on sense bus 156 indicative of a level of strain on semiconductor die 112. In one example, SGS 114-3 is actuated without heater circuit 114-2 being actuated to generate heat. In one example, sensor signal has a first enable state for enabling ILS 114-1 and a second enable state for enabling SGS 114-3.

FIG. 8 is a block and schematic diagram generally illustrating sensing circuitry package 110, according to one example. The example implementation of FIG. 8 is similar to that of FIG. 7, except that array 120 includes a first array 120-1 of memory elements 122-1, and a second array 120-2 of memory elements 122-2. In one example, first array 120-1 is to serially receive a first segment of select bits, comprising sensor select bits, via path 124-1 from control circuitry 130 for selecting sensors ILS 114-1 and ILS 114-3 of sensing zones SZ(0) to SZ(n), and second array 120-2 is to serially receive a second segment of select bits, comprising heater select bits, via path 124-2 from control circuitry 130 for selecting heater circuits 114-2 of sensing zones SZ(0) to SZ(n).

Additionally, actuator logic 150 includes sensor actuation logic 150-1 and heater actuation logic 150-2. In one example, sensor actuation logic 150-1 is to respectively provide actuation signals 166-1 and 166-2 to ILS 114-1 and SGS 114-3 based on the state of the sensor select bit received from memory element 122-1 and on the state of sensor enable signal 152. In one example, when the respective sensor select bit has a "non-select" state, sensor actuation logic 150-1 is so actuate neither ILS 114-1 nor SGS 114-3. In one example, when the respective sensor select bit has a "select" state, sensor actuation logic 150-1 is to provide actuation signal 166-1 to activate ILS 114-1 when sensor enable signal 152 has the first enable state corresponding to ILS 114-1, and to provide actuation signal 166-2 to activate SGS 114-3 when sensor enable signal 152 has the second enable state corresponding to SGS 114-3. In one example, only one sensor select bit of a segment of sensor select bits serially received by array 120-1 has a "select" state so that only one ILS 114-1 or one SGS 114-3 of sensing zones SZ(0) to SZ(n) may be actuated at a time to provide a sense signal on sense bus 156.

Similarly, heater actuation logic 150-2 is to provide actuation signal 168 to heater circuit 114-2 based on the state of the heater select bit received from memory element 122-2 and on the state of heater enable signal 154. In one example, when the respective heater select bit has a "non-select" state, heater actuation logic 150-2 is to not actuate heater circuit 114-3. In one example, when the respective sensor select bit has a "select" state, heater actuation logic 150-2 is to provide actuation signal 168 to heater circuit 114-2 when heater enable signal 154 has a state enabling heater circuit 114-2.

In one example, during a liquid level sensing operation employing ILS sensors 114-1 of sensing zones, SZ(0) to SZ(n), first and second segments of select bits respectively received by arrays 120-1 and 120-2 are a same segment of select bits so that ILS 114-1 and heater circuit 114-2 of a same sensing zone are concurrently selected for actuation (in a fashion similar to that of the example of FIG. 4 where only a one memory element 122 corresponds to each sensing zone SZ(0) to SZ(n)).

By employing first memory array 120-1 for selecting sensors ILS 114-1 and SGS 114-3, and second memory array 120-2 for selecting heater circuits 114-2 which is separate from first memory array 120-1, heater circuits 114-2 may be selected independently from ILS 114-1 and SGS 114-3, such that heater circuits 114-2 of one or more sensing zones, SZ(0) to SZ(n) may be employed to generate heat for some sensing operations on sensing die 112.

According to one example, heater circuits 114-2 of a subset of sensing zones, SZ(0) to SZ(n), may be simultaneously selected and actuated to generate heat. In one case, the subset is a set of consecutive sensing zones of sensing zones SZ(0) to SZ(n), such as sensing zones SZ(50) to SZ(75), for example. In one example, as illustrated by FIG. 8, in addition to select data register 162, control circuitry 130 includes a second select data register 164. In one example, when generating the second segment of select bits (comprising heater select bits), select data generator 160 comprises a counter which serially loads "0's" into memory array 120-2 until the counter equals the zone value stored in first select data register 162. The counter then serially loads "1's" into memory array 120 until the counter reaches the zone value stored in second select data registers 164, at which point the counter returns to serially loading "0's" until the complete second segment of heater select bits has been loaded into memory array 120-2. As such, segment data registers 162 and 164 respectively define a beginning and an end of a set of sensing zones in which heater circuits 114-2 are to be activated.

In one example, heater circuit 114-2 of each sensing zone, SZ(0) to SZ(n), may be simultaneously selected and actuated to generate heat. According to one such example, when simultaneously selecting heater circuit 114-2 of each sensing zone, segment data registers 162 and 164 respectively hold the values of "0" and "n". Simultaneously generating heat with each heater circuit 114-2 heats sensing die 112 across sensing zones SZ(0) to SZ(n). In one example, when evenly heated in such fashion, control circuitry 130 may employ global temperature sensor 136 to sense an average temperature across sensing zones SZ(0) to SZ(n), where such average temperature is indicative of a level of print liquid 140 in reservoir 142, and may serve as a verification of a level of print liquid 140 determined using ILS sensors 114-1, such as described above.

In examples, voltage source, Vcc, and power line 158 have a maximum power level which may be supplied, such that a number of heater circuits 114-1 which can be simultaneously selected and actuated to generate heat may be limited based on the power requirements of each heater circuit 114-1. According to one example, heater circuit 114-2 of each sensing zone SZ(0) to SZ(n) may have a number of different power levels which can be selected depending on a sensing operation to be performed by sensing die 112, where an amount of heat generated by heater circuit 114-2 is different for each power level.

In one example, each heater circuit 114-2 may have three selectable power levels (e.g., low, medium, and high power levels), where the a high power level is selected when a liquid level sensing operation is performed using a single ILS 114-1/heater circuit 114-2 pair. In one example, the low power level is selected when heater circuit 114-2 of each sensing zone, SZ(0) to SZ(n), are simultaneously actuated to generate heat. In one example, the medium power level is selected when a subset of heater circuits 114-2 of sensing zones, SZ(0) to SZ(n), are actuated to generate heat. In each case, a total power requirement of the combination of actuated heater circuits 114-2 does not exceed a maximum power level capable of being supplied by voltage source, Vcc, and power line 158.

FIG. 9A is a block and schematic diagram generally illustrating one example of a heating circuit 114-2 of sensing circuitry package 110, such as for sensing a level of print liquid 140 in fluid reservoir 142 of replaceable print component 104, such as illustrated by FIG. 8. According to one example, heater circuit 114-2 includes an electrical heater element 190 to generate heat when energized. A number of control devices 192, illustrated as control devices 192(0) to 192(n), are individually controllable to be electrically connected to heater element 190 (as illustrated by dashed lines) to adjust an amount of heat generated by heater element 190. In one example, heater element 190 dissipates a different amount of heat when electrically connected to different ones of the control devices 192(0) to 192(n). In one example, when electrically connected to heater element 190, each control element 192 adjusts a voltage level across and a current level through heater element 190, such that heater element 190 generates a different amount of heat when electrically connected to different ones of control devices 192(0) to 192(n).

In one example, heater element 190 comprises a resistive heater element, with each control device 192(0) to 192(n) to selectively connect a resistance in series with heater element 190 to adjust a voltage level across and a current level through heater element 190 which, as a result, adjusts an amount of heat generated by heater element 190. In one example, as will be described in greater detail below, each control device 192(0) to 192(n) connects an increasingly smaller resistance in series with heater element 190 such that each control device 192(0) to 192(n) results in heater element 190 generating an increasingly larger amount of heat (up to a maximum amount of heat depending on electrical limitations of heater element 190.

FIG. 9B is a block and schematic diagram generally illustrating heater circuit 114-2, according to one example, where heater element 190 may selectively generate at least three heat levels of heat (e.g., low, medium, and high power levels). In one example, heater element 190 is an electrical resistor 190 having a resistance, Rheater, coupled between a fixed voltage source, Vcc, and a node 194.

According to one example, control devices 192 comprise switches 192(0), 192(1), and 192(2) to actuate heater element 190 by connecting heater element 190 between Vcc and a reference, such as ground, where each switch 192(0) to 192(n) has a different respective resistance, illustrated as resistances R0, R1, and R2. In one example, as illustrated, each controllable switch 192 (0), 192(1), and 192(2) is a transistor, with resistances R0, R1, and R2 representing an "on-resistance" of each transistor. In one example, each transistor is a MOSFET. In one example, actuation switches 192(0), 192(1), and 192(2) are connected in parallel with one another between node 194 and ground, with each switch being individually connectable in series with heater element 190 via respective actuation signals Heat(0), Heat(1), and Heat(2). In one example, as will be described in greater detail below (see FIG. 10A), actuation signals Heat(0), Heat(1), and Heat(2) are provided by heater actuation logic 150-2 (see FIG. 8).

The power (P) generated by heater element 190 (where the resulting generated heat is proportional to the power) is equal to the square of the heater current, Iheater, multiplied by the heater resistance, Rheater (P=Iheater$^2$*Rheater), where the heater current, Iheater, is equal to the voltage, Vcc, divided by the combined resistance (Rtotal) of heater element 190, where Rtotal is equal to the sum of Rheater, and the "on" resistance, R(x), of the selected one of the switches 192, where x is equal to 1, 2 or 3 (Iheater=Vcc/Rtotal; where Rtotal=Rheater+R(x)).

In view of the above, the smaller the "on" resistance, R(x), of the switch 192 selectively connected in series with heater element 190, the greater the heater current, Iheater, and the greater the power output (P) of heater element 190. Similarly, the larger the "on" resistance, R(x) of the switch 192 selectively connected in series with heater element 190, the smaller the heater current, Iheater, and the smaller the power output (P) of heater element 190. According to one example, the "on" resistance of MOSFET switches 192(0), 192(1), and 192(2) depends on the physical size of the switch, where the "on" resistance decreases as the physical size of the switch increases.

As the "on" resistance of the selected switch 192 increases, an amount of heat dissipated by via the "on" resistance of switch 192 increases and an amount of heat dissipated by heater element 190 decreases, such that the portion of the total amount of heat generated by heater circuit 114-2 which is generated by switch 192 increases as the "on-resistance" increases. Conversely, as the "on" resistance of the selected switch 192 decreases, an amount of heat dissipated by heater element 190 increases and an amount of heat dissipated by the "on" resistance of switch 192 decreases, such that the portion of total heat generated by heater circuit 114-2 which is generated by heater element 190 increases as the "on-resistance of switch 192 decreases. In one example, R0>R1>R2, such that switch 192(0) corresponds to the low power level of heater element 190, switch 192(1) corresponds to the medium power level of heater element 190, and switch 192(2) corresponds to the high power level of heater element. In one example, in low power and medium power modes, more heat is dissipated by switch 192(2) than by heater element 190.

As described above, an amount of current, Iheater, which can be drawn via power line voltage source, Vcc, and power line 158 is limited. According to one example, the resistance, Rheater, of heater element 190 and the on resistance, R(2) of high power level switch 192(2) are selected such that during high power mode, the resulting heater current, Iheater, has a level that enables only one heater circuit 114-2 of sensing zones SZ(0) to SZ(n) to be actuated at a given time, so that an optimal amount of heat is transferred to the respective ILS 114-1 to enable an optimal sensing of the presence or absence of fluid proximate to ILS 114-1 (such as described by FIGS. 5 and 6 above).

In one example, the resistance, Rheater, of heater element 190 and the on resistance, R(2) of high power mode switch 192(2) are configured such that the resulting level of heater current, Iheater, causes heater element 190 to transfer as much heat as possible to the respective ILS 114-1 within the pulse duration, Δtopt (see FIG. 6), without damaging print liquid 142 (e.g., boiling the print liquid).

According to one example, the "on" resistance, R(0) of low power mode switch 192(0) is selected such that when in combination with the resistance, Rheater, of heater element 190, the resulting heater current, Iheater, enables the heater circuit 114-2 of each sensing zone SZ(0) to SZ(n) to be simultaneously actuated. In one example, MOSFET switches 190(0), 190(1) and 190(2) are disposed in substrate 170 of semiconductor die 112 (see FIG. 5). When in low power mode, MOSFET switch 190(2) of each heater circuit 114-2 dissipates more heat within substrate 170 than respective heater element 190 dissipates in an upper metal layer (e.g., metal-4), such that sensing die 112 is evenly heated across sensing zones SZ(0) to SZ(n). In one example, a duration of a heat pulse for actuating low power mode MOSFET switch 190(2) is longer than that employed during high power mode. As described above, in one example, sensing die 112 employs the low power mode of operation to determine a level of print liquid 140 based on an average temperature across sensing zones SZ(0) to SZ(n) as sensed by global thermal sensing resistor 136 (see FIG. 2).

Similarly, according to one example, the "on" resistance, R(1) of medium power mode switch 192(1) is selected such that when in combination with the resistance, Rheater, of heater element 190, the resulting heater current, Iheater, enables the heater circuit 114-2 of a subset or "window" of sensing zone SZ(0) to SZ(n) to be simultaneously actuated. For example, the heater circuit 114-2 of a series or window of ten sensing zones may be simultaneously actuated. When in medium power mode, MOSFET switch 190(1) of each heater circuit 114-2 dissipates more heat within substrate 170 than respective heater element 190 in an upper metal layer (e.g., metal-4), such that sensing die 112 is evenly heated across the selected window of sensing zones. In one example, a duration of a heat pulse for actuating medium power mode MOSFET switch 190(1) is longer than that employed during high power mode, but shorter than that employed for low power mode. In one example, controller 130 of sensing die 112 determines a level of print liquid 140 by employing global thermal sensing resistor 136 to measure an average temperature over a sliding window of sensing zones during a medium power heating mode operation.

Low and medium power heating modes may be employed by controller 130 for other sensing operations other than sensing print liquid levels via ILS sensors 114-1, such as in conjunction with strain-gauges 114-3, for example.

Although illustrated above a being in connected in series with heater element 190, in other examples, control devices 192 may be connected in parallel with heater element 190, such as when a constant current source is employed to energize heater circuit 114-2 in lieu of constant voltage source Vcc. Further, although illustrated and described primarily in terms of only one control device 192 at a time being electrically connected to heater element 190, in other examples, more than one control device may simultaneously connected to heater element 190, such as in series with heater element 190 and/or in parallel with heater element 190.

FIG. 10A is a schematic diagram generally illustrating heater actuation logic 150-2 (such as illustrated by FIG. 8) for a heater circuit 114-1 employing a three heating levels (such as illustrated by FIG. 9B), according to one example. Heater actuation logic 150-2 includes a local memory element 200 which receives the heater select bit from the respective memory element 122-2 of array 120-2 (see FIG. 8). In one example, when a segment of heater select bits has been loaded into array 120-2, the heater select bits are parallel-shifted from memory elements 122-2 to the local memory element 200 of the respective heater actuation logic 150-2, at which time array 120-2 can begin loading a next segment of heater select bits. Additionally, heater actuator logic 150-2 receives heater enable signal 154 where, according to one example, heater enable signal 154 includes a first heater enable signal (Heat Enable 0) 154-1, and a second heater enable signal (Heat Enable 1) 154-2.

In one example, heater select logic 150-2 includes a NAND-gate 202, an inverter 204, a NOR-gate 206, an AND-gate 208, and a NOR-gate 210. NAND-gate 202 receives the heat select bit and heat enable signal "0" as inputs, and provides as its output high power heater actuation signal Heat(2). NOR-gate 206 receives as inputs inverted heat enable signal "1" and the output of NOR-gate 206. AND-gate 208 receives as inputs the heat select bit, heat enable signal "1", and inverted heat enable signal "0", and provides as its output medium power heater actuation signal Heat(1). NOR-gate 210 receives as inputs heat enable signal "1" and the output of NAND-gate 202, and provides as its output low power heater actuation signal Heat(0).

In operation, when the heater select bit (of the second segment of select bits) has a select value (logic "1"), heater actuation signal Heat(0) is high when heat enable signal "0" is high and heat enable signal "1" is low, heater actuation signal Heat(1) is high when heat enable signal "0" is low and heat enable signal "1" is high, and heater actuation signal Heat(2) is high when heat enable signals "0" and "1" are high. Heater actuation signals Heat(0), Heat(1) and Heat(2) are each low when both heat enable signal "0" is low (non-enable state) and heat enable signal "1" is low (non-enable state). Heater actuation signals Heat(0), Heat(1) and Heat(2) are also low when the heater select bit has a non-select value (logic "low").

FIG. 10B is a schematic diagram generally illustrating sensor actuation logic 150-1 (such as illustrated by FIG. 8), according to one example. Sensor actuation logic 150-1 includes a local memory element 220 which receives the heater select bit from the respective memory element 122-1 of array 120-1 (see FIG. 8). In one example, when a segment of sensor select bits has been loaded into array 120-1, the sensor select bits are parallel-shifted from memory elements 122-1 to the local memory element 220 of the respective sensor actuation logic 150-1, at which time array 120-1 can begin loading a next segment of sensor select bits. Additionally, sensor actuator logic 150-2 receives sensor enable signal 152 where, according one example, sensor enable signal 152 includes a first sensor enable signal (Sense Enable 0) 152-1, and a second sensor enable signal (Sense Enable 1) 154-2.

In operation, when the sensor select bit has a select value (logic "1"), sensor actuation signal 166-1 for corresponding ILS 114-1 is high when Sense Enable signal "0" is high, and sensor actuation signal 166-2 for SGS 114-2 is high when Sense Enable signal "1" is high. Sensor actuation signals 166-1 and 166-2 for respective ILS 114-1 and SGS 114-3 each a logic low when the sense select bit has a non-select value (logic "0").

FIG. 11 is a flow diagram generally illustrating a method 250 of operating a sensor circuitry package for a replaceable print apparatus component, according to one example, such as sensor circuitry package 110 of FIG. 4 for replaceable print apparatus component 104 of FIG. 3, for example. At 252, method 250 includes defining a number of sensing zones, each sensing zone having a number of sensing devices, each sensing device having a respective sensing function, such as sensing zones SZ(0) to SZ(n) of FIG. 4, each sensing zone having one sensing device comprising a heater circuit 114-2 for generating heat, and a sensing device comprising a thermal sensor 114-1 to sense a temperature of sensor circuitry package 110, where such sensed temperature may be indicative of a level of a print liquid within a reservoir of replaceable print apparatus component 104.

At 254, method 250 includes serially loading a segment of select data bits into an array of memory elements, each select bit having a one of a select value and a non-select value, and each memory element corresponding to a respective sensing zone, such as array 120 of memory elements 122 serially loading a segment of select bits, with each memory element 122 corresponding to a respective one of sensing zones SZ(0) to SZ(n).

At 256, for a memory element having a select value, method 250 includes selecting at least one sensing device of the respective sensing zone to be enabled to perform its respective sensing function.

In example, method 250, as indicated at 258, further includes communicating a number of enable signals to each sensing zone, each enable signal corresponding to a number of sensing devices of each sensing zone, with each enable signal having a non-enable state and an enable state, such as sensor enable signal 152 and heater enable signal 154 being communicated to each sensing zone SZ(0) to SZ(n) of FIG. 4, with sensor enable signal 152 corresponding to thermal sensor ILS 114-1 and heater enable signal 154 corresponding to heater circuit 114-2 of each sensing zone.

In one example, as indicated at 260, for each sensing zone, method 250 further includes actuating a selected sensing device to perform its corresponding sensing function when the corresponding enable signal has the enable state, such as heater enable signal 154 having an enable state to actuate a selected heater circuit 114-2 to generate heat, and sensor enable signal 152 having an enable state to actuate a selected thermal sensor 114-1 to sense a temperature resulting from heat generated by actuated heater circuits, where such sensed temperature is indicative of a print liquid level within replaceable print apparatus component 104.

FIG. 12 is a flow diagram generally illustrating a method 300 of operating a liquid level sensor package, according to one example, such as liquid level sensor package 110 of FIG. 4 for replaceable print apparatus component 104 of FIG. 3, for example. At 302, method 300 includes defining a number of sensing zones, each sensing zone including a heater circuit having a number of selectable power levels and including a heating element to generate a different amount of heat at each power level, such as sensing zones SZ(0) to SZ(n) of FIG. 8, each having a heater circuit 114-1 having a number of selectable power levels, such as illustrated by heater circuit 114-1 of FIG. 9B.

At 304, method 300 includes serially loading a segment of select bits into an array of memory elements, each select bit having a select value and a non-select value, and each memory cell corresponding to a respective one of the sensing zones, such as array 120-2 of memory elements 122-1 of FIG. 8, the array 120-2 to serially load a segment of heater select bits via communication path 124-2, with each memory element 120-2 corresponding to a respective one of the sensing zones SZ(0) to SZ(n).

At 306, method 300 including selecting the heater circuit of each sensing zone having a corresponding memory element having a select value to enable the heater to generate heat. At 308, the method includes actuating each selected heater circuit to generate heat at a selected one of the power levels, the selected power level depending on a number of selected heater circuits.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A liquid sensor package, comprising:
a number of heater circuits, each heater circuit including:
a heater element to dissipate heat; and
a number of control devices, each control device individually controllable to be electrically connected to the heater element, the heater element to dissipate a different amount of heat when electrically connected to different ones of the control devices.

2. The liquid sensor package of claim 1, when electrically connected to the heater element, each control device to dissipate a different amount of heat, such that an amount of heat dissipated by the heater circuit, including the heat dissipated by the heater element and the heat dissipated by the control device, is different when the heater element is connected to different ones of the control devices.

3. The liquid sensor package of claim 2, the number of control devices including a high power control device and a low power control device, an amount of heat dissipated by the heater circuit when the high power control device is electrically connected to the heater element being greater than an amount of heat dissipated by the heater circuit when the low power control device is electrically connected to the heater element.

4. The liquid sensor package of claim 3, when the high power control device is electrically connected to the heater element, the amount of heat generated by the heater element being a majority of the amount of heat generated by the heater circuit.

5. The liquid sensor package of claim 3, when the low power control device is electrically connected to the heater element, the amount of heat generated by the low power control device being a majority of the amount of heat generated by the heater circuit.

6. The liquid sensor package of claim 1, when electrically connected to the heater element, each control device to cause a different voltage across and a different current through the heater element.

7. The liquid sensor package of claim 1, when electrically connected the heater element, each control device connected in series with the heater element between a voltage source and a reference voltage.

8. The liquid sensor package of claim 1, the heater element being a resistive heater element.

9. The liquid sensor package of claim 1, each control device being a switch.

10. The liquid sensor package of claim 9, each switch being transistor having an on-resistance.

11. The liquid sensor package of claim 10, each transistor having a different on-resistance.

12. The liquid sensor package of claim 1, including a number of thermal sensors, each thermal sensor corresponding to a different one of the heater circuits to measure a temperature resulting from heat dissipated by the heater element of the respective heater circuit, the sensed temperature indicative of a fluidic agent proximate to the thermal sensor.

13. A liquid sensor package, the package comprising:
a number of sensing zones, each sensing zone including:
a heater circuit having a number of selectable power levels including:
a heater element to generate heat; and
a number of control devices, each control device individually controllable to be electrically connected to the heater element and each corresponding to a different one of the power levels, when electrically connected to the heater element, each control device to generate a different amount of heat and each heater element to dissipate a different amount of heat such that an amount of heat generated by the heater circuit, including the heat generated by the heater element and the heat generated by the control device, is different for each control device and heater combination; and
an array of memory elements, each memory element corresponding to a respective one of the sensing zones, during a sensing operation, the array of memory elements to:
serially load a segment of select bits, each select bit having one a select value and a non-select value, a memory element having a select value to select the heater circuit of the to be enabled to generate heat.

14. The liquid sensor package of claim 13, including:
an enable line communicating a heater enable signal to each sensing zone, for each sensing zone:
the heater enable signal having an enable state to actuate a selected heater circuit to generate heat at selected one of the power levels by connecting the control device corresponding to the selected one of the power levels in electrical combination with the heater element.

15. The liquid sensor package of claim 14 the selected power level depending on the number of selected heater circuits of the number of sensing zones.

16. The liquid sensor package of claim 15, the enable signal having one of a number of enable states, each enable state corresponding to a different power level.

17. The liquid sensor package of claim 13, each heater circuit, the number of selectable power levels including a low power level, a medium power level, and a high power level.

18. The liquid sensor package of claim 17, the heater enable signal to have an enable state corresponding to the high power level when the heater circuit of only one sensing zone is selected.

19. The liquid sensor package of claim 17, the heater enable signal to have an enable state corresponding to the low power level when the heater circuit of each sensing zone is selected.

20. The liquid sensor package of claim 17, the heater enable signal to have an enable state corresponding to the medium power level when the heater circuit of a subset of sensing zone is selected, the subset being more than one sensing zone and less than all sensing zones.

21. The liquid sensor package of claim 17, the heater element generating a majority of the amount of heat generated by the heater circuit when at the high power level, the respective control device generating a majority of the amount of heat generated by the heater circuit when at the low power level or medium power level.

22. The liquid sensor package of claim 13, each sensing zone including a thermal sensor to sense a temperature resulting from heat generated by the respective heater element, the sensed temperature indicative of a presence of liquid along the sensor package.

23. The liquid sensor package of claim 13, including a substrate and a number of metal layers disposed on the substrate, for each heater circuit, the control devices disposed in the substrate and the heater element disposed in one of the metal layers such that heat generated by the control devices is dissipated in the substrate and heat generated by the heater element is dissipated in the metal layer.

* * * * *